US011429159B2

(12) United States Patent
Hsu

(10) Patent No.: US 11,429,159 B2
(45) Date of Patent: Aug. 30, 2022

(54) TAPE STRUCTURE AND THE DISPLAY PANEL AND DISPLAY DEVICE UTILIZING THE TAPE STRUCTURE

(71) Applicant: AU OPTRONICS CORPORATION, Hsin-Chu (TW)

(72) Inventor: Ching-Feng Hsu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 467 days.

(21) Appl. No.: 16/740,532

(22) Filed: Jan. 13, 2020

(65) Prior Publication Data
US 2020/0301483 A1   Sep. 24, 2020

(30) Foreign Application Priority Data

Mar. 22, 2019   (TW) ................................. 108110159

(51) Int. Cl.
 *G06F 1/18* (2006.01)
 *C09J 7/20* (2018.01)
 *C09J 201/00* (2006.01)

(52) U.S. Cl.
 CPC ................ *G06F 1/181* (2013.01); *C09J 7/20* (2018.01); *C09J 201/00* (2013.01)

(58) Field of Classification Search
 CPC .... B32B 3/04; B32B 3/10; B32B 3/14; B32B 3/16; B32B 3/18; B32B 3/28; B32B 3/30; G06F 1/16; G06F 1/1601; G06F 1/1613; G06F 1/18; G06F 1/181; G06F 1/182; G06F 1/183

USPC .......... 428/71, 156, 158, 161, 173, 178, 201
See application file for complete search history.

(56) References Cited

U.S. PATENT DOCUMENTS

| 6,515,721 B2 | 2/2003 | Jin et al. |
| 9,345,152 B2 | 5/2016 | Chang |
| 2005/0211839 A1* | 9/2005 | Movsesian ............ B32B 27/285 244/119 |

FOREIGN PATENT DOCUMENTS

| CN | 103268168 A | 8/2013 |
| CN | 103629286 A | 3/2014 |

OTHER PUBLICATIONS

CNIPA has issued the Office Action for the corresponding China application dated Mar. 29, 2021.

* cited by examiner

*Primary Examiner* — Zachary M Davis
(74) *Attorney, Agent, or Firm* — WPAT, PC

(57) ABSTRACT

A tape structure, a display panel and a display device utilizing the tape structure is provided. The tape structure includes a first adhesive layer, a supporting layer, and a second adhesive layer. The first adhesive layer extends along a first direction and has a first surface. The supporting layer is disposed on the first surface and includes a plurality of supporting units. A part of the second adhesive layer is attached to the first surface. The supporting layer is covered by the first adhesive layer and the second adhesive layer located at the side of the supporting layer opposite to the first surface.

17 Claims, 8 Drawing Sheets

TAPE STRUCTURE AND THE DISPLAY PANEL AND DISPLAY DEVICE UTILIZING THE TAPE STRUCTURE

BACKGROUND OF THE INVENTION

1. Field of the Invention

The present disclosure relates to a tape structure and a display panel and a display device utilizing the tape structure. Specifically, the present disclosure relates to a tape structure that reduces residual adhesives, and a display panel and a display device utilizing such tape structure.

2. Description of the Prior Art

Tapes are often used in electronic devices to secure components in electronic devices, or as a protection layer between components. Take a display device as an example. The position of a driving circuit corresponding to a non-display area is usually attached with tapes so that the display panel and the back-light module are fixed in the display device. Conventionally, such tapes have complex structures consisting of different adhesive layers, and the thickness of each adhesive layer is very thin, when the tapes need to be reworked, it often occurs that some adhesive layers are removed but some residual adhesive layers are left in the non-display area and are not easily discovered. In that situation, when new tapes are attached to the non-display area, the residual adhesive layers will make the surface of the new tape to be uneven, affecting subsequent assembly. As such, the tapes currently used in today's electronic devices still need to be improved.

SUMMARY OF THE INVENTION

The present disclosure provides a tape structure which reduces the possibility of leaving residual adhesives when reworked.

The present disclosure provides a display panel and a display device. The display panel and the display device include a tape structure. The assembly efficiency of the display panel and the display device may be improved by using the tape structure.

The tape structure includes a first adhesive layer, a supporting layer, and a second adhesive layer. The first adhesive layer extends along a first direction, and has a first surface. The supporting layer is disposed on the first surface, and the supporting layer includes a plurality of supporting units. A part of the second adhesive layer is attached to the first surface. The supporting layer is covered by the first adhesive layer and the second adhesive layer located at the side of the supporting layer opposite to the first surface.

The display panel includes a substrate, an electronic component, and a tape structure. The substrate has a surface, and the electronic component is disposed on such surface. The tape structure covers the substrate and the electronic component, and the tape structure includes a first adhesive layer, a supporting layer, and a second adhesive layer. The first adhesive layer extends along a first direction, and has a first surface. The supporting layer is disposed on the first surface, and the supporting layer includes a plurality of supporting units. A part of the second adhesive layer is attached to the first surface. The supporting layer is covered by the first adhesive layer and the second adhesive layer located at the side of the supporting layer opposite to the first surface. The second adhesive layer is located between the first adhesive layer and the substrate.

The display device includes a display panel, a backlight module, and a frame. The backlight module is disposed on a side of the display panel, and the frame is disposed on the display panel and located at the side of the tape structure opposite to the substrate. The frame contacts the first adhesive layer. Assembly efficiency of the display device may be improved by using the tape structure.

DETAILED DESCRIPTION OF THE PREFERRED EMBODIMENT

It should be understood that, when an element such as a layer, film, region or substrate is referred to as being "on" or "connected to" another element, such element may be directly on or connected to such other element, or there may be other elements therebetween. In contrast, when an element is referred to as being "directly on" or "directly connected to" another element, there is no element therebetween It should be understood that terms such as "first", "second", "third" can be used to describe various elements, components, regions, layers and/or portions in the following specification, but these elements, components, regions, layers and/or portions should not be limited by such terms. Such terms are merely used to differentiate an element, a component, a region, a layer and/or a portion from another element, component, region, layer and/or portion. Thus, in the following discussion, a first element, component, region, layer or color light may be called a second element, component, region, layer or color light and such practice will not depart from the teaching of the present disclosure.

Figure 1A:
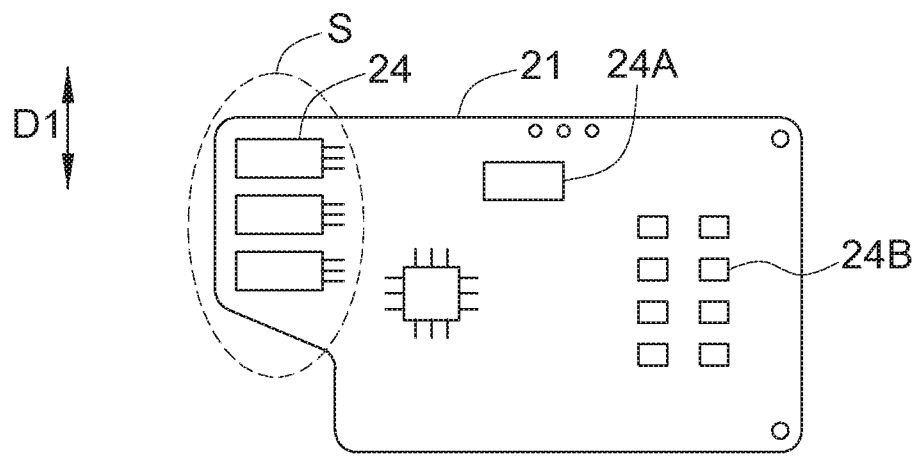
FIG. 1A and FIG. 1B are diagrams of tape structures in the present disclosure used on substrates.
Figure 1B:
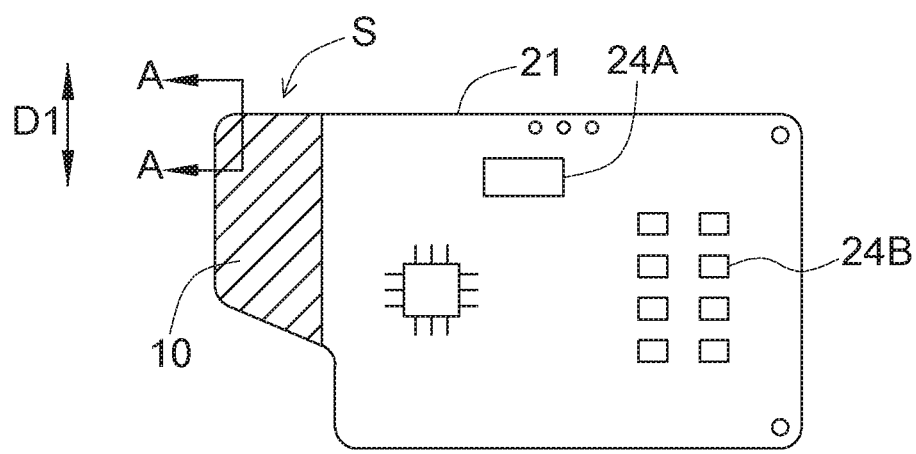

FIG. 1A and FIG. 1B are diagrams of tape structures of the present disclosure used on substrates. The said substrate, for example, may be a printed circuit board (PCB), as shown in FIG. 1A. A plurality of electronic components (24, 24A, and 24B) are disposed on a substrate 21, wherein a tape structure needs to be attached to the area S (for example, based on the requirements for assembly or protection). As shown in FIG. 1B, a tape structure 10 is attached to the area S along a first direction D1, and, as shown in FIG. 1A and FIG. 1B, an electronic component 24 located in the area S is covered by the tape structure 10.

Figure 2A:
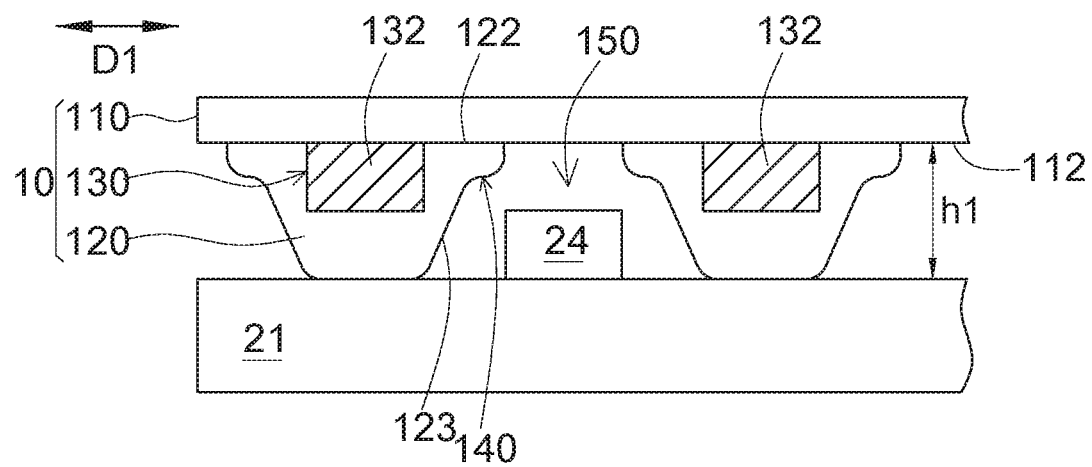
FIG. 2A is an enlarged section view of an embodiment of the tape structure.

FIG. 2A is an enlarged section view of an embodiment of the tape structure 10. FIG. 2A is an enlarged section view along the AA line illustrated in FIG. 1B. It should be noted that, for the purpose of illustrating the feature of the tape structure, the tape structure 10 and the substrate 21 are not drawn to scale in FIG. 2A and similar FIGs that follow. As shown in FIG. 2A, the tape structure 10 covers the substrate 21. The tape structure 10 includes a first adhesive layer 110, a supporting layer 130, and a second adhesive layer 120. The first adhesive layer 110 extends along a first direction D1, and has a first surface 112. The supporting layer 130 is disposed on the first surface 112; in other words, the supporting layer 130 is located at the side of the first surface 112 of the first adhesive layer 110; that is, it is located at the side of the first adhesive layer 110 facing the substrate 21. The supporting layer 130 includes a plurality of supporting units 132. In the present embodiment, the supporting layer 130 consists of a plurality of supporting units 132, and none of the plurality of supporting units 132 are connected each other. That is, the supporting layer 130 may be cut into a plurality of parts to form a discontinuous layer. However, in a different embodiment, the supporting units 132 may be connected to each other to form a continuous layer.

In addition, the second adhesive layer 120 includes a second surface 122 disposed near the first surface 112 (that is, the surface facing the first surface 112). The second adhesive layer 120 is partially attached to the first surface 112 and covers the supporting layer 130 on the side opposite the first layer 112 together with the first adhesive layer 110. As shown in FIG. 2A, a portion of the second adhesive layer 120 is directly attached to the first surface 112, and another portion of the second adhesive layer 120 is attached to the first surface 112 against the supporting units 132, interposing the supporting units 132 between the first adhesive layer 110 and the second adhesive layer 120. Through this configuration, the supporting units 132 may be attached to the first adhesive layer 110 using the portion of the second adhesive layer 120 that is attached to the first surface 112. In this way, when the tape structure 10 is reworked, removing the first adhesive layer 110 will, at the same time, remove the supporting units 132 and the second adhesive layer 120, thereby preventing leaving residual adhesives when the tape structure 10 is reworked.

In addition, the tape structure 10 covers an electronic component 24 on the substrate 21. As shown in FIG. 2A, the second adhesive layer 120 is located between the first adhesive layer 110 and the substrate 21. For example, the first adhesive layer 110 may be an antistatic adhesive layer configured to prevent the electronic component 24 from causing electrostatic injury. The second adhesive layer 120 may be a double-sided tape. Furthermore, the second adhesive layer 120 includes a third surface 123 opposite to the second surface 122, and both the second surface 122 and the third surface 123 may be adhesive. In other words, both the surface of the second adhesive layer 120 facing the first adhesive layer 110 and the surface of the second adhesive layer 120 facing the substrate 21 are adhesive. In the present embodiment, the first surface 112 of the first adhesive layer 110 may not be adhesive. In another embodiment, the first surface 112 of the first adhesive layer 110 and the third surface 123 of the second adhesive layer 120 are adhesive, and the second surface 122 of the second adhesive layer 120 isn't adhesive. In other words, the second adhesive layer 120 is a single-sided tape and the first adhesive layer 110 has an adhesive first surface 112. One may choose the types of adhesive layers needed for the tape structure 10 based on production process requirements.

The supporting units 132, for example, may be of rubber material, silicon rubber material, or materials using polycarbonate. As shown in FIG. 2A, the supporting units 132 are spaced apart and distributed along the first direction D1, and the tape structure 10 has a space for accommodating the electronic component 24 between two of the supporting units 132. Specifically, the first adhesive layer 110 and the second adhesive layer 120 attached to an adjacent supporting unit 132 together form a concave portion 140; the concave portion 140 and the substrate 21 together define an accommodation space 150 for accommodating the electronic component 24. In other words, the portion of the second adhesive layer 120 that is attached to the portion of the supporting units 132 opposite to the first surface 112 (that is, the portion attached to the substrate 21) is raised by the supporting units 132 and has a height difference of h1 with the first surface 112, thereby forming an accommodation space 150.

Figure 2B:
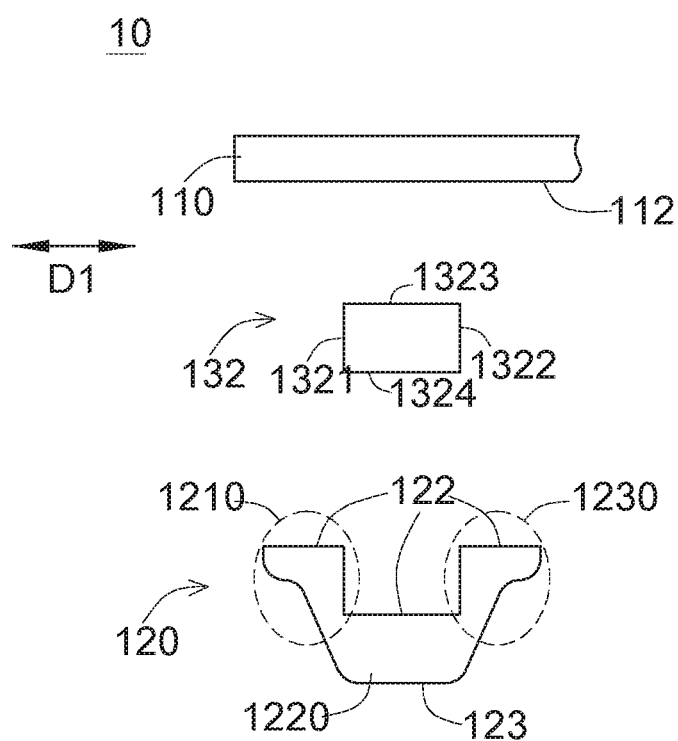
FIG. 2B is an exploded view corresponding to the tape structure shown in FIG. 2A.

FIG. 2B is an exploded view corresponding to the tape structure 10 in FIG. 2A. As shown in FIG. 2B, with respect to the supporting units 132, each of the supporting units 132 includes a first side surface 1321, a second side surface 1322, a top surface 1323 and a lower surface 1324. The top surface 1323 is disposed on the first surface 112, and the lower surface 1324 is located at the side of the supporting units 132 opposite to the top surface 1323. The first side surface 1321 and the second side surface 1322 are respectively connected to the top surface 1323 and the lower surface 1324 on the right and left sides illustrated in FIGs. With respect to the second adhesive layer 120, as mentioned above, the second adhesive layer 120 includes a second surface 122 (that is, a surface facing the first surface 112) disposed near the first surface 112. In addition, along the first direction D1 the second adhesive layer 120 includes three sections: a first section 1210, a second section 1220, and a third section 1230. The said three sections are connected to each other in the present embodiment. However, in a different embodiment, spaces may exist between two of the sections.

As shown in FIG. 2A and FIG. 2B, a portion of the first section 1210 is attached to the first surface 112, and another portion of the first section 1210 extends away from the first surface 112 and is attached to the first side surface 1321 via the second surface 122. The second section 1220 is connected to one side of the first section 1210 and attached to the lower surface 1324 via the second surface 122. As shown in FIG. 2B, a connection portion between the first section 1210 and the second section 1220 is curved at the location near the lower surface 1324 to change the extension direction to extend along the direction parallel to the first direction D1. The third section 1230 is connected to the side of the second section 1220 opposite to the first section 1210, as shown in FIG. 2B. A connection portion between the second section 1220 and the third section 1230 is curved at the location near the lower surface 1324 to change the extension direction to extend toward the first surface 112. A portion of the third section 1230 is attached to the second side surface 1322 via the second surface 122, and another portion of the third section 1230 extends toward the first surface 112 and is attached to the first surface 112.

Overall, the second adhesive layer 120 is disposed over the first adhesive layer 110 in a segmented form. Each segment of the second adhesive layer 120 has three sections, and the three sections of the second adhesive layer 120 form a saclike structure. The supporting units 132 are located at the space within the saclike structure so that the supporting units 132 are enclosed by the second adhesive layer 120 and the first adhesive layer 110. In addition, a portion of the first section 1210 that is attached to the first surface 112 and a portion of the third section 1230 that is attached to the first surface 112 together fix the supporting units 132 to the first adhesive layer 110. In this way, when the tape structure 10 is reworked, since the first adhesive layer 110 and the second adhesive layer 120 are directly attached, removing the first adhesive layer 110 will, at the same time, remove the supporting units 132 and the second adhesive layer 120, so as to avoid leaving residual adhesives when the tape structure 10 is reworked.

With respect to the electronic component 24, the supporting units 132 located on both sides of the electronic component 24 make the thickness of the tape structure 10 thicker at the positions corresponding to the locations of the supporting units 132; that is, there exists a height difference h1 between the second section 1220 of the second adhesive layer 120 and the first surface 112 of the first adhesive layer 110 so that the accommodation space 150 for accommodating the electronic component 24 is defined.

In the embodiment shown in FIG. 2A and FIG. 2B, the supporting units 132 are directly disposed on the first surface 112. That is, the top surface 1323 directly contacts the first surface 112, and other surfaces of the supporting units 132 other than the top surface 1323 are covered by the second adhesive layer 120. In another embodiment, for example, if a first adhesive layer 110 which is not adhesive is used, an adhesive layer may be added between the top surface 1323 and the first surface 112. That is, the top surface 1323 contacts the first surface 112 through the added adhesive layer. The added adhesive layer may be a double-sided tape like the second adhesive layer 120. The supporting units 132 are attached to the first adhesive layer 110 via the added adhesive layer and the second adhesive layer 120 covering surfaces other than the top surface 1323. In this way, it is possible to avoid leaving residual adhesives when the tape structure 10 is reworked.

Figure 2C:
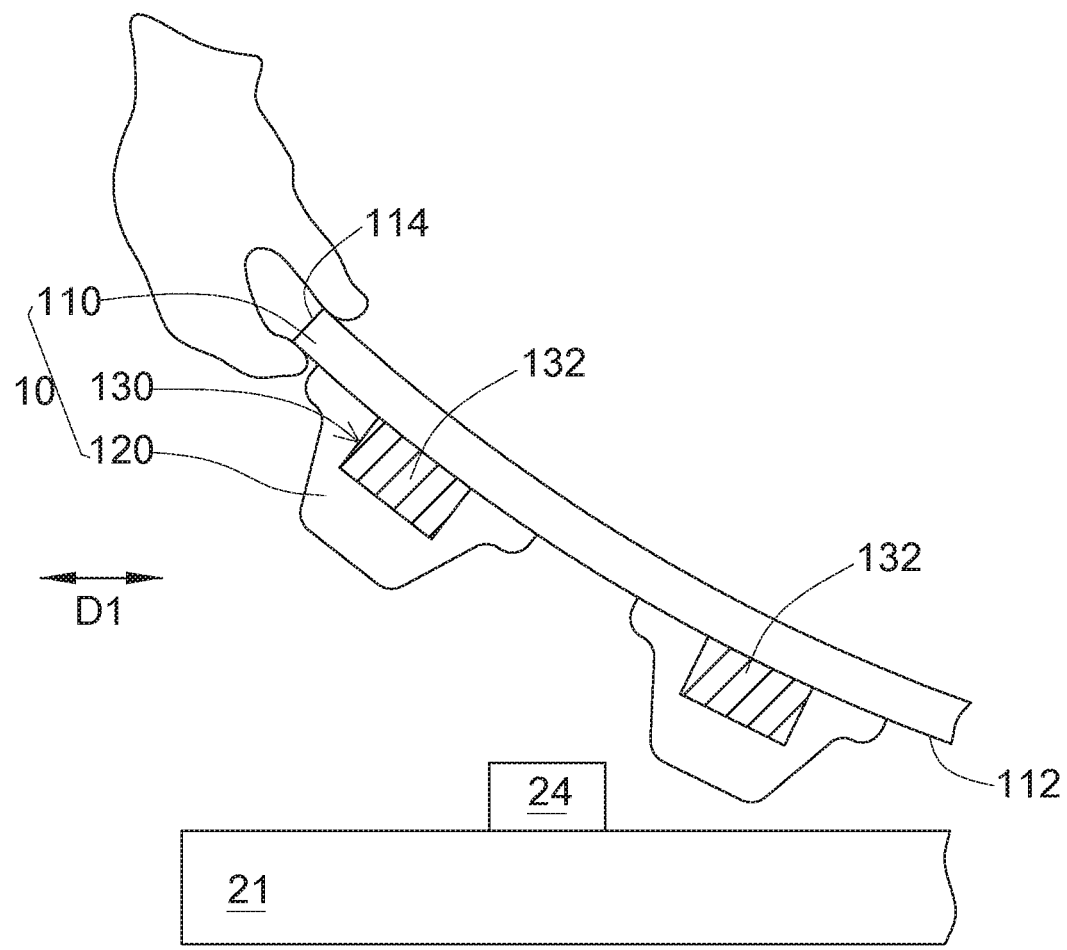
FIG. 2C is a diagram of removing the tape structure shown in FIG. 2A.

FIG. 2C is a diagram showing the removal of the tape structure 10 in FIG. 2A. As shown in FIG. 2C, because the adhesion between the first surface 112 and the second surface 122 is greater than the adhesion between the second adhesive layer 120 and the substrate 21, when the tape structure 10 is removed by grabbing an edge 114 of the first adhesive layer 110, the first adhesive layer 110, the supporting units 132, and the second adhesive layer 120 may be removed together to avoid leaving residual adhesives.

Figure 3A:
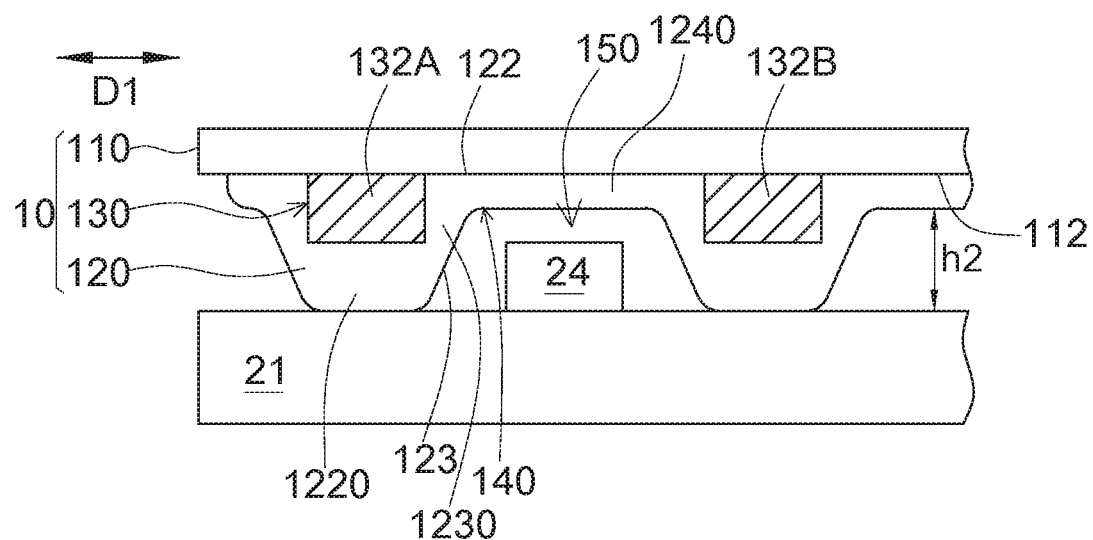
FIG. 3A and FIG. 3B are enlarged section views of different embodiments of tape structures.

FIG. 3A is an enlarged section view of another embodiment of the tape structure 10. As shown in FIG. 3A, the difference between the present embodiment and the aforementioned embodiment is that the second adhesive layer 120 further includes an extended section 1240 extending along the first direction D1. The extended section 1240 connects to the side of the third section 1230 opposite to the second section 1220, and the extended section 1240 is attached to the first surface 112 via the second surface 122. Furthermore, in the present embodiment, the second adhesive layer 120 is continuously distributed over the first adhesive layer 110. The second adhesive layer 120 covering adjacent supporting units are connected to each other through the extended section 1240. For example, one side of the extended section 1240 is connected to the third section 1230 of the supporting units 132A, and another side of the extended section 1240 is connected to the first section 1210 of the supporting units 1328.

In addition, the extended section 1240 and the portion of the second adhesive layer 120 attached to adjacent supporting units (132A, and 132B) together form the concave portion 140. The concave portion 140 has the accommodation space 150 facing the substrate 21 for accommodating the electronic component 24. In other words, the portion of the second adhesive layer 120 that is attached to the portion of the supporting units (132A, and 1328) opposite to the first surface 112 (that is, the second section 1220) has a height difference h2 with the extended section 1240 so that the accommodation space 150 is defined. Through this configuration, the extended section 1240 increases the strength of adhesion of the second adhesive layer 120 in fixing the supporting units (132A, and 132B) to the first adhesive layer 110. In this way, when the tape structure 10 is reworked, removing the first adhesive layer 110 will remove, at the same time, the supporting units (132A, and 132B) and the second adhesive layer 120 so that it is possible to avoid leaving residual adhesives when the tape structure 10 is worked.

Figure 3B:
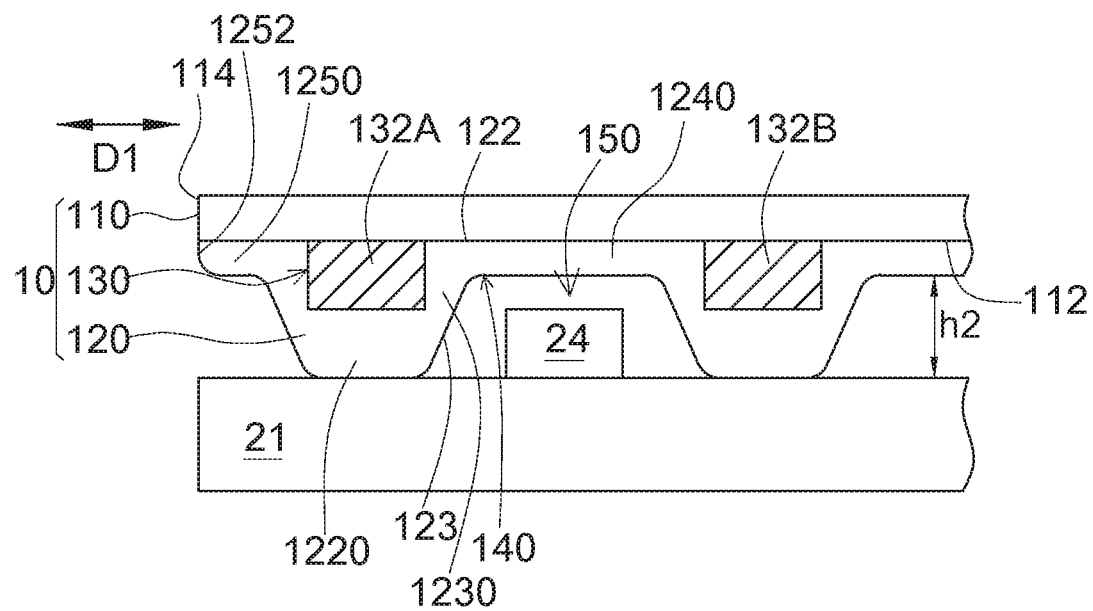

FIG. 3B is an enlarged section view of another embodiment of the tape structure. As shown in FIG. 3B, the differences between the present embodiment and the aforementioned embodiment are that the second adhesive layer 120 further includes an edge section 1250 extending along the first direction D1 in the illustrated section. The first adhesive layer 110 has a first edge 114 extending along the direction transverse to the first direction D1. The edge section 1250 extends toward the first edge 114 of the first adhesive layer 110, and the edge section 1250 of the second adhesive layer 120 is aligned with the first edge 114. Through this configuration, when the tape structure 10 is to be removed, the first edge 114 of the first adhesive layer 110 and the edge 1252 of the second adhesive layer 120 may be grabbed together (that is, grabbing the first edge 114 and the edge 1252 of the second adhesive layer 120 so that they are not easily separated). Then the first adhesive layer 110, the supporting units (132A, and 132B), and the second adhesive layer 120 are removed together to avoid leaving residual adhesives.

Figure 4A:
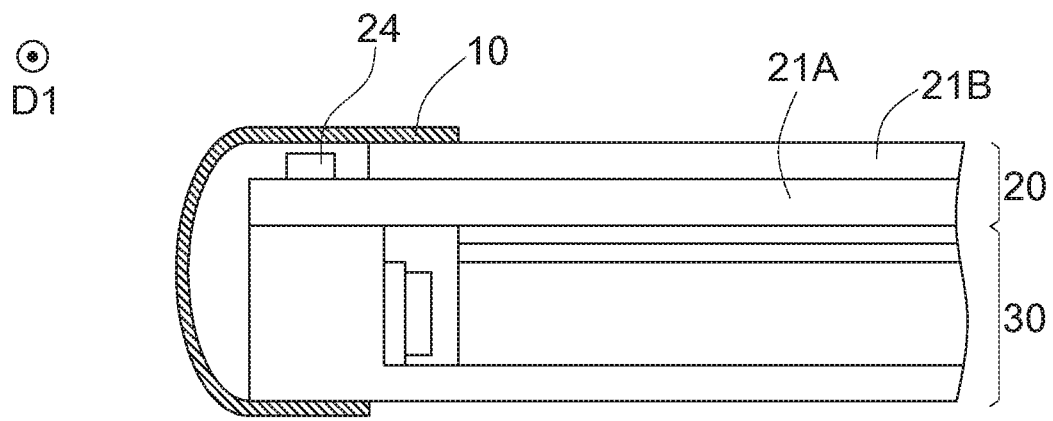
FIG. 4A is a side section view of a display panel using the tape structure.
Figure 4B:
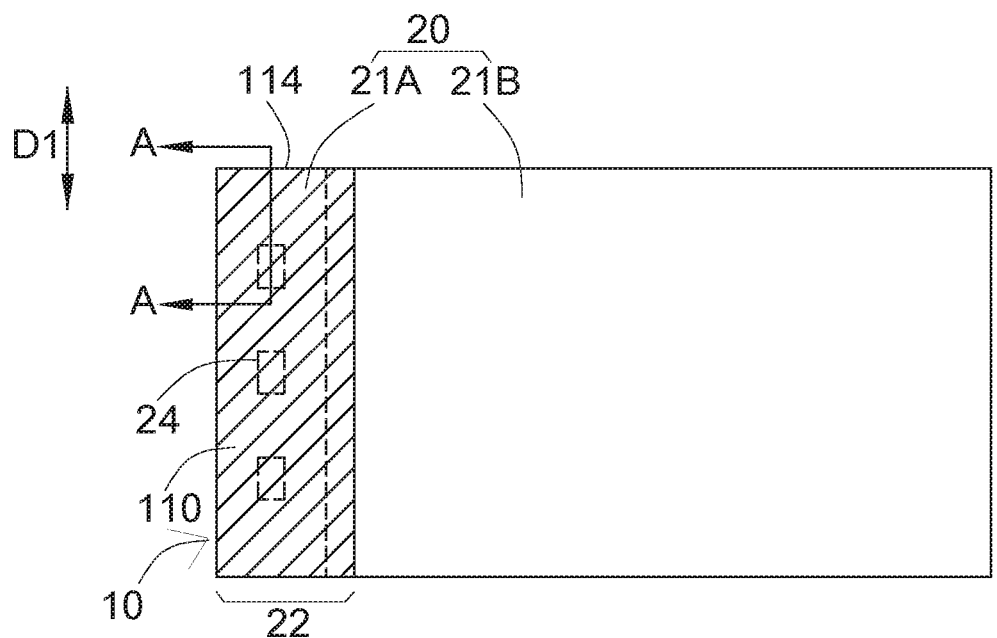
FIG. 4B is a diagram of a display panel using the tape structure in the present disclosure

FIG. 4A is the side view of a display panel using the tape structure. FIG. 4B is a diagram of another embodiment of a display panel using the tape structure of the present disclosure. FIG. 4B is the top view of FIG. 4A. As shown in FIG. 4A and FIG. 4B, a display panel 20 includes a substrate 21A and a substrate 21B. The said substrate 21A, for example, may be a Thin-Film Transistor (TFT) substrate; the substrate 21B, for example, may be a color gel substrate. A plurality of electronic components 24, such as source driving circuits or gate driving circuits, are disposed on the substrate 21A. As shown in FIG. 4B, the tape structure 10 is attached to the position located at a non-display area 22 on the substrate 21A. As shown in FIG. 4A and FIG. 4B, the tape structure 10 is attached to the non-display area 22 along the first direction D1, and the electronic components 24 located on the non-display area 22 are covered by the tape structure.

Figure 5:
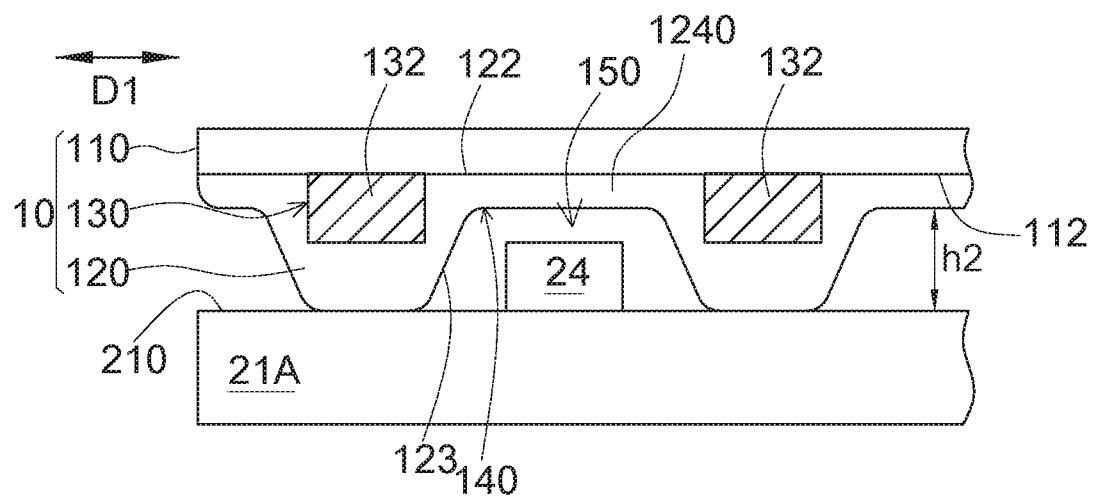
FIG. 5 and FIG. 6 are enlarged section views of different embodiments of the tape structures.
Figure 6:
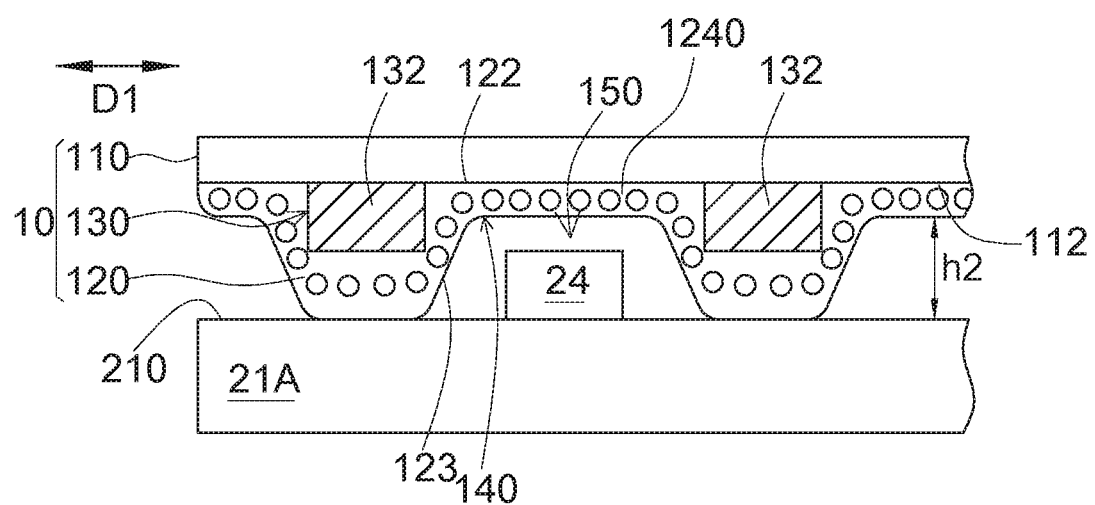

FIG. 5 and FIG. 6 are enlarged section view of different embodiments of the tape structures. FIG. 5 and FIG. 6 are enlarged section views illustrated along the AA line in FIG. 4B. As shown in FIG. 5, the display panel includes the substrate 21A, the electronic component 24, and the tape structure 10. The substrate 21A has a surface 210, and the electronic component 24 is disposed on the surface 210. The tape structure 10 covers the substrate 21A and the electronic component 24, and the tape structure 10 includes the first adhesive layer 110, the supporting layer 130, and the second adhesive layer 120. The first adhesive layer 110 extends along the first direction D1, and has the first surface 112. The supporting layer 130 is disposed on the first surface 112; in other words, the supporting layer 130 is located at a side of the first surface 112 of the first adhesive layer 110, that is, located at the side of the first adhesive layer 110 facing the substrate 21A. The supporting layer 130 includes a plurality of the supporting units 132. In the present embodiment, the supporting layer 130 consists of the supporting units 132, and none of the supporting units 132 are connected to each other; that is, the supporting layer 130 may be cut into a plurality of sections to form a discontinuous layer. The second adhesive layer 120 is partially attached to the first surface 112 and covers the supporting layer 130, together with the first adhesive layer 110, from the side of the supporting layer 130 opposite to the first surface 112.

In addition, the second adhesive layer 120 is located between the first adhesive layer 110 and the substrate 21. As shown in FIG. 5, the second adhesive layer 120 is attached to the substrate 21A, and the first adhesive layer 110 is located on the side of the second adhesive layer 120 opposite to the substrate 21A. In addition, the extended section 1240 and the second adhesive layer 120 that is attached to adjacent supporting units 132 together form the concave portion 140. The concave portion 140 has the accommodation space 150 facing the substrate 21A for accommodating the electronic component 24. It should be noted that the tape structure as shown in FIG. 3B is used in the display panel of FIG. 5, but not limited thereto. In another embodiment, the tape structure as shown in FIG. 2A or FIG. 3A may be used in a display panel.

As shown in FIG. 6, the differences between the present embodiment and the aforementioned embodiment are that the second adhesive layer 120 is formed by applying and curing glue. For example, liquid adhesive may be applied to the first surface 112 of the first adhesive layer 110 and the supporting units 132 (all surfaces other than the side of the supporting units 132 that is attached to the first surface 112). After the application, the tape structure 10 will be attached to the substrate 21A, and the second adhesive layer 120 is formed after the liquid adhesive is cured. Through this configuration, the degree and area of adhesion between the second adhesive layer 120 and the supporting units 132 and between the second adhesive layer 120 and the first surface 112 may be further enhanced.

Figure 7A:
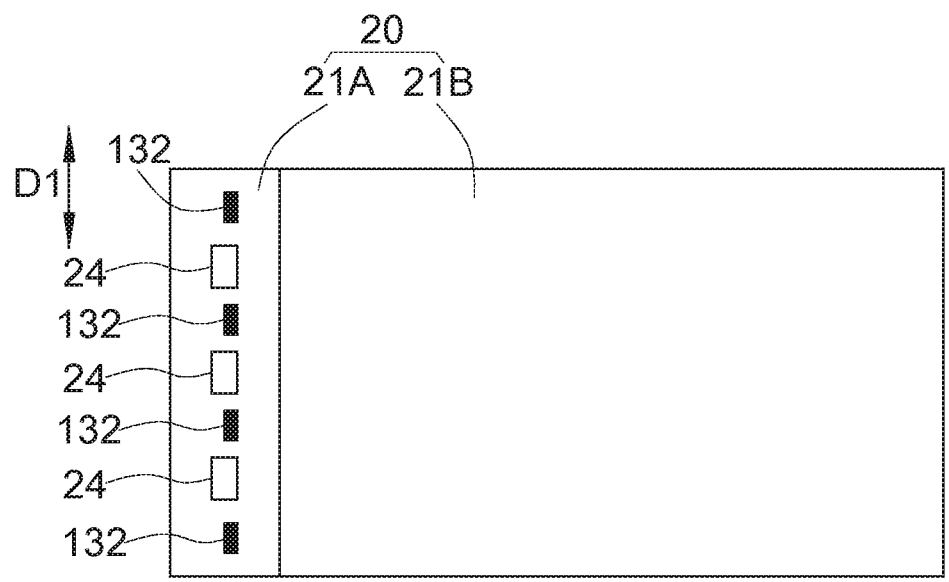
FIG. 7A and FIG. 7B are diagrams of embodiments of supporting units distributed in different ways
Figure 7B:
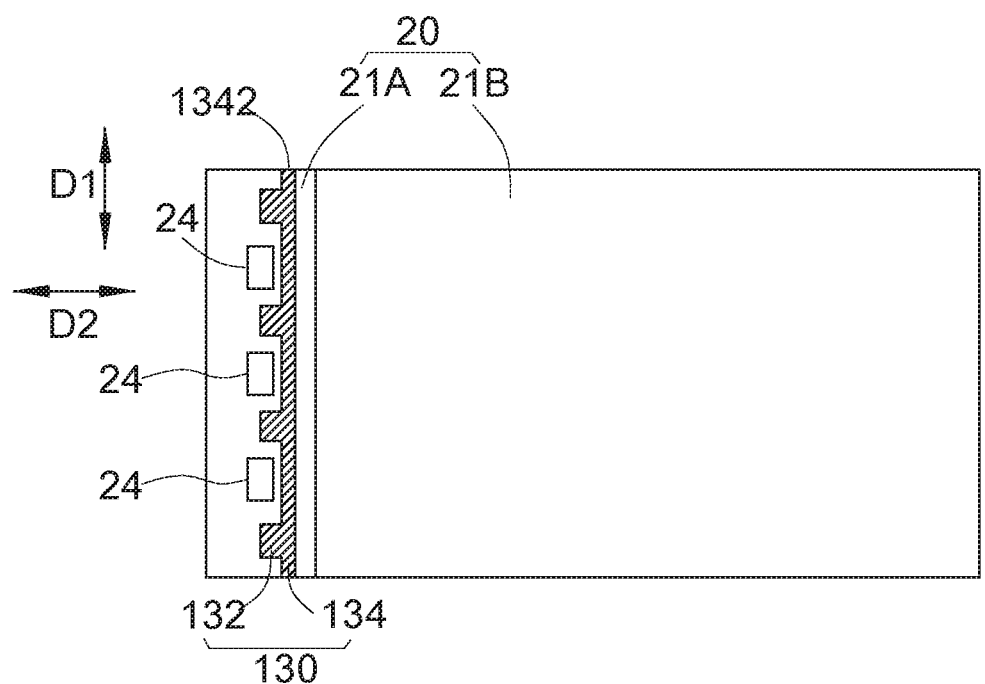

FIG. 7A and FIG. 7B are diagrams of embodiments of the supporting units 132 distributed in different ways. FIG. 7A and FIG. 7B illustrate different embodiments of the supporting units 132 distributed on a display panel 20. For the convenience of description, in FIG. 7A and FIG. 7B, only the supporting units 132 of the tape structure is illustrated. As shown in FIG. 7A, the supporting units 132 are spaced apart and distributed along the first direction D1. The electronic component 24 is located between two adjacent supporting units 132. As mentioned above, an accommodation space between two adjacent supporting units 132 is formed in the tape structure so that the electronic component 24 can be accommodated.

In another embodiment shown in FIG. 7B, each of the supporting units 132 is connected to each other. Specifically, referring to FIG. 4B and FIG. 7B, as shown in FIG. 4B, the first adhesive layer 110 has a first edge 114 extending along the direction transverse to the first direction D1. On the other hands, as shown in FIG. 7B, the supporting layer 130 includes a connection portion 134 extending along the first direction D1. An edge 1342 of the connection portion 134 is aligned with the first edge 114 (please refer to FIG. 4B). The supporting units 132 are respectively connected with the connection portion 134 and respectively extend out of the connection portion 134 along the direction transverse to the first direction D1 (for example, along the direction parallel to the second direction D2). Then the adjacent supporting units 132 and the portion of the connection portion 134 between such adjacent supporting units together define a space for accommodating the electronic component 24. Through this configuration, when the tape structure is to be removed, one may hold the first edge 114 of the first adhesive layer and the edge 1342 of the supporting layer to remove the first adhesive layer, the supporting units, and the second adhesive layer together to avoid leaving residual adhesives. In another embodiment, the edge of the second adhesive layer may be extended, as aforementioned, to be aligned with the first edge of the first adhesive layer, so that when the tape structure is to be removed, one may hold the edges of the first adhesive layer, the supporting layer and the second adhesive layer and remove all three layers together.

Figure 8:
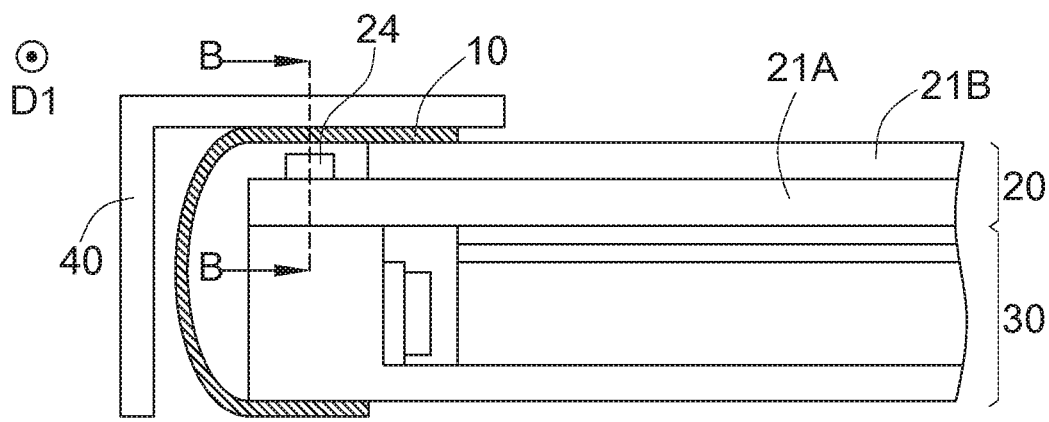
FIG. 8 is a side section view of a display device using the tape structure.

FIG. 8 is a side view of a display device 1 using the tape structure 10. As shown in FIG. 8, the display device 1 includes the display panel 20, a backlight module 30, and a frame 40. The backlight module 30 is disposed on a side of the display panel 20, and the frame 40 is disposed on the display panel 20 and located at the side of the tape structure 10 opposite to the substrate 21A. In other words, the portion of the display panel 20 on which the frame 40 is disposed is the side of the display panel 20 opposite to the backlight module 30. In addition, one side of the tape structure 10 is attached to the display panel 20, and another side of the tape structure 10 is attached to the backlight module 30.

Figure 9:
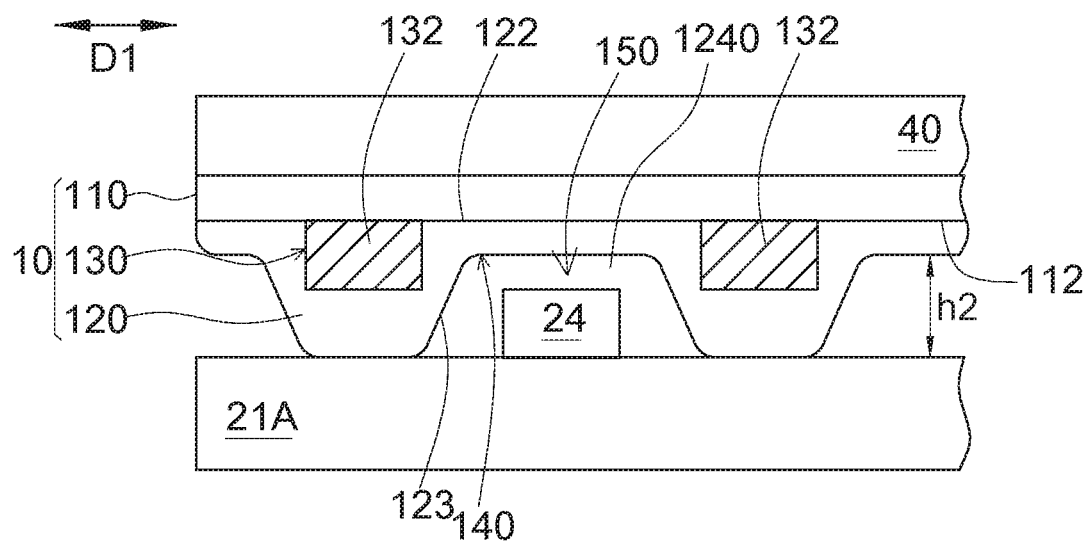
FIG. 9 is an enlarged section view of the tape structure seen from another direction.

FIG. 9 is an enlarged section view of the tape structure from another angle. FIG. 9 is an enlarged section view illustrated along the BB line in FIG. 8. As shown in FIG. 9, the portion of the display panel covered by the tape structure 10 is located between the frame 40 and the substrate 21A of the display panel. The frame 40 contacts the first adhesive layer 110, and the substrate 21A contacts the second adhesive layer 120. As shown in FIG. 9, the first adhesive layer 110 is attached to the frame 40, and the second adhesive layer 120 is attached to the substrate 21A. The first adhesive layer 110 is located on the side of the second adhesive layer 120 opposite to the substrate 21A. The first adhesive layer 110 is originally located on top of the second adhesive layer 120 in the tape structure 10. However, after the tape structure wraps around the backlight module 30, the two layers are turned upside down, making the second adhesive layer 120 contact and be attached to the backlight module 30. In addition, the extended section 1240 and the second adhesive layer 120 attached to adjacent supporting units 132 together form a concave portion 140. The concave portion 140 has the accommodation space 150 facing the substrate 21A so that the electronic component 24 is accommodated. Since there is an accommodation space 150 defined between two supporting units 132, when the frame 40 is assembled in the display panel, damage to the electronic component 24 in the accommodation space 150 can be avoided. In addition, when the tape structure 10 of the display device 1 is required to be reworked (i.e. to remove the tape structure 10), through the configuration of the present disclosure, the first adhesive layer 110, the supporting units 132, and the second adhesive layer 120 may be removed together by grabbing the edge of the first adhesive layer 110 to avoid leaving residual adhesives.

The present disclosure has been described with reference to the above embodiments, but the above embodiment are merely examples for implementing the present disclosure. It should be noted that the disclosed embodiments are not intended to limit the scope of the present invention. On the contrary, any modification and equivalent configuration within the spirit and scope of the appended claims shall fall within the scope of the present invention.

What is claimed is:

1. A tape structure, comprising:
a first adhesive layer extending along a first direction and having a first surface;
a supporting layer disposed on the first surface, the supporting layer comprising a plurality of supporting units; and
a second adhesive layer partially attached to the first surface, wherein the supporting layer is covered by the first adhesive layer and the second adhesive from a side of the supporting layer opposite to the first surface.

2. The tape structure according to claim 1, wherein:
the plurality of supporting units are spaced apart and distributed along the first direction, and each of the plurality of supporting units comprises:
a top surface disposed on the first surface;
a lower surface located at a side of the supporting unit opposite to the top surface;
a first side surface and a second side surface respectively connected to the top surface and the lower surface;
the second adhesive layer comprises a second surface disposed near the first surface, and along the first direction the second adhesive layer comprises:
a first section, wherein a portion of the first section is attached to the first surface, and another portion of the first section extends away from the first surface and is attached to the first side surface by the second surface;
a second section connected to a side of the first section and attached to the lower surface by the second surface; and
a third section connected to a side of the second section opposite to the first section, wherein a portion of the third section is attached to the second side surface by the second surface, and another portion of the third section extends toward the first surface and is attached to the first surface.

3. The tape structure according to claim 2, wherein the second adhesive layer further comprises an extended section extending along the first direction, the extended section is connected to a side of the third section opposite to the second section, and the extended section is attached to the first surface by the second surface.

4. The tape structure according to claim 2, wherein the second adhesive layer comprises a third surface opposite to the second surface; the second surface and the third surface are adhesive.

5. The tape structure according to claim 2, wherein the second adhesive layer comprises a third surface opposite to the second surface, the first surface and the third surface are adhesive, and the second surface is not adhesive.

6. The tape structure according to claim 1, wherein the second adhesive layer is formed by coating and curing a glue.

7. The tape structure according to claim 1, wherein the first adhesive layer has a first edge extending along a direction transverse to the first direction, the supporting layer comprises a connection portion extending along the first direction, an edge of the connected portion is aligned with the first edge, and the plurality of supporting units are respectively connected to the connection portion and respectively extend out from the connection portion along the direction transverse to the first direction.

8. A display panel, comprising:
a substrate having a surface;
an electronic component disposed on the surface; and
a tape structure covering the substrate and the electronic component, the tape structure comprising:
a first adhesive layer extending along a first direction and having a first surface;
a supporting layer disposed on the first surface, the supporting layer comprising a plurality of supporting units;
a second adhesive layer partially attached to the first surface, wherein the supporting layer is covered by the first adhesive layer and the second adhesive from a side of the supporting layer opposite to the first surface, and the second adhesive layer is located between the first adhesive layer and the substrate.

9. The display panel according to claim 8, wherein:
the plurality of supporting units are spaced apart and distributed along the first direction, and each of the plurality of supporting units comprises:
a top surface disposed on the first surface;
a lower surface located at a side of the supporting units opposite to the top surface;
a first side surface and a second side surface respectively connected to the top surface and the lower surface;
the second adhesive layer comprises a second surface disposed near the first surface, and along the first direction the second adhesive layer comprises:
a first section, wherein a portion of the first section is attached to the first surface, and another portion of the first section extends away from the first surface and is attached to the first side surface by the second surface;
a second section connected to a side of the first section and attached to the lower surface by the second surface; and
a third section connected to a side of the second section opposite to the first section, wherein a portion of the third section is attached to the second side surface by the second surface, and another portion of the third section extends toward the first surface and is attached to the first surface.

10. The display panel according to claim 9, wherein the first adhesive layer and the second adhesive layer attached to an adjacent one of the supporting units together form a concave portion; the concave portion and the substrate together define an accommodation space for accommodating the electronic component.

11. The display panel according to claim 9, wherein the second adhesive layer further comprises an extended section extending along the first direction, the extended section is connected to a side of the third section opposite to the second section, and the extended section is attached to the first surface by the second surface.

12. The display panel according to claim 11, wherein the extended section and the second adhesive layer attached to an adjacent one of the supporting units together form a concave portion; the concave portion and the substrate together define an accommodation space for accommodating the electronic component.

13. The display panel according to claim 9, wherein the second adhesive layer comprises a third surface opposite to the second surface; the second surface and the third surface are adhesive.

14. The display panel according to claim 9, wherein the second adhesive layer comprises a third surface opposite to the second surface, the first surface and the third surface are adhesive, and the second surface is not adhesive.

15. The display panel according to claim 8, wherein the second adhesive layer is formed by coating and curing a glue.

16. The display panel according to claim 8, wherein the first adhesive layer has a first edge extending along a direction transverse to the first direction, the supporting layer comprises a connection portion extending along the first direction, an edge of the connection portion is aligned with the first edge, and the plurality of supporting units are respectively connected to the connection portion and respectively extend out from the connection portion along the direction transverse to the first direction.

17. A display device, comprising:
- the display panel according to claim 8;
- a backlight module disposed on a side of the display panel; and
- a frame disposed on the display panel and located at a side of the tape structure opposite to the substrate, the frame contacting the first adhesive layer.

\* \* \* \* \*